C. RADCLIFFE.
Assignor to THE NEW JERSEY MANUFACTURING COMPANY.
METALLIC BUTTON.
No. 10,917. Reissued Mar. 27, 1888.
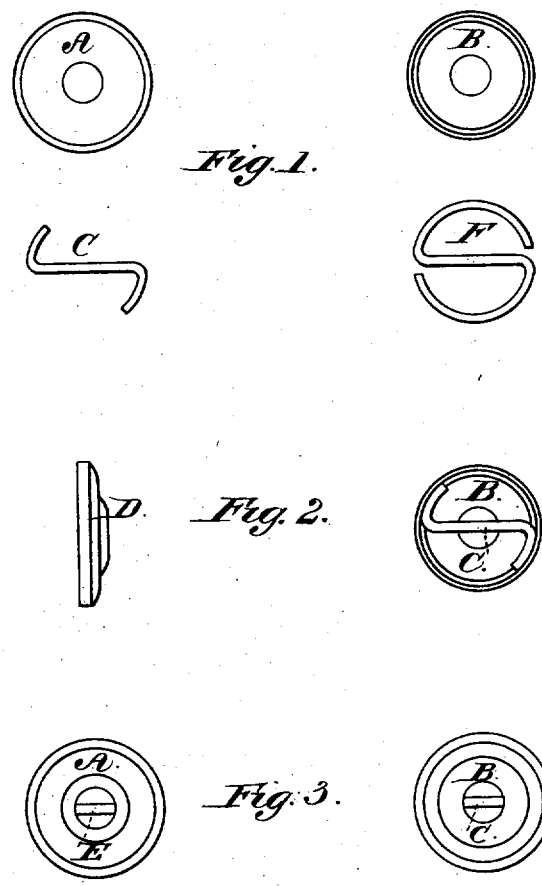
WITNESSES:
Nottingham Williams
Chas. W. Hoadley
INVENTOR,
Charles Radcliffe,
BY
Henry E. Everding.
ATTORNEY
N. PETERS, Photo-Lithographer, Washington, D. C.

UNITED STATES PATENT OFFICE.

CHARLES RADCLIFFE, OF NEWARK, NEW JERSEY, ASSIGNOR TO THE NEW JERSEY MANUFACTURING COMPANY, OF SAME PLACE.

METALLIC BUTTON.

SPECIFICATION forming part of Reissued Letters Patent No. 10,917, dated March 27, 1888.

Original No. 216,973, dated July 1, 1879. Application for reissue filed February 18, 1888. Serial No. 264,541.

*To all whom it may concern:*

Be it known that I, CHARLES RADCLIFFE, of the city of Newark, county of Essex, and State of New Jersey, have invented a new and useful Improvement in Metallic Buttons, of which the following is a specification.

The invention relates to buttons which are stamped out of metal sheets with dies.

Heretofore metallic buttons have been made either of one piece of metal or of two hollow metallic disks joined together by bending the edge of one disk over the other. The disadvantage of the first-named kind of button was the weight of the button when made of metal sufficiently heavy for strength, and of the latter method the weakness of any single thickness of metal sufficiently thin to stamp. When such buttons were perforated also, two semicircular eyes were usually made in the center of the buttons, leaving a part of the metal between them to form a bar for the thread. The edges of this bar had a tendency to cut the thread. Buttons have also been made in which a metal loop is projected through a central perforation in one disk and was held by the ends of the loop being clasped between the disk.

My invention consists of a button made by inserting between the metallic disks, which have been previously perforated with central round holes, a strengthening-piece made of wire, which not only makes a round transverse bar across the center of the perforations, over which the thread will be held on passing it entirely through the button, but which is so formed or bent at the ends as to follow and conform to the inner edge of the disk in which it is to be placed. By this means I form a very strong and light button, and the transverse bar, being round and smooth, will not cut the thread. This form of bar has several advantages. It not only strengthens the button against bending, but it can also be readily and cheaply made of ordinary wire; and in the operation of making the button by machinery it necessarily and readily centers itself in the proper position without special pains to adjust it, thereby conducing to the cheapness and rapidity of the manufacture.

In the accompanying drawings, A and B, Figures 1, 2, and 3, are the metallic disks, perforated with one large round hole in each disk, instead of two semicircular ones or several small round ones, as is usually the case.

C and F are different forms of the transverse thread-bar, whose characteristics I claim as valuable, and which I regard as substantially identical.

In Figs. 1 and 2 the disks are shown before the edges are bent over to clasp the disks together.

D, Fig. 2, is a side view of the completed button, and Fig. 3 gives a top and bottom view of the completed button.

What I claim is—

In a metallic button consisting of two disks joined together, a transverse bar of round wire with the ends bent, as at C, so as to substantially conform to the inner circumference of the disk in which it is placed, substantially as and for the purpose described.

CHARLES RADCLIFFE.

Witnesses:

CHAS. G. F. WAHLE, Jr.,
HENRY E. EVERDING.